United States Patent
Herring

Patent Number: 6,064,992
Date of Patent: May 16, 2000

[54] POSTAGE METER USING TWO ASCENDING REGISTERS IN AN ACCOUNTING FUNCTION

[75] Inventor: William James Herring, Brentwood, United Kingdom

[73] Assignee: Neopost Limited, Essex, United Kingdom

[21] Appl. No.: 08/851,854

[22] Filed: May 6, 1997

[30] Foreign Application Priority Data

May 8, 1996 [GB] United Kingdom ............... 9609614

[51] Int. Cl.[7] ................................................ G06F 17/60
[52] U.S. Cl. .................. 705/403; 705/60; 705/61; 705/62; 705/400; 705/401; 705/403; 705/404; 705/410
[58] Field of Search .................................... 705/400, 401, 705/402, 403, 404, 408, 60, 61, 62, 30, 410; 395/108

[56] References Cited

U.S. PATENT DOCUMENTS

| | | | |
|---|---|---|---|
| 4,097,923 | 6/1978 | Eckert, Jr. et al. | 364/900 |
| 4,807,139 | 2/1989 | Liechti | 364/464.02 |
| 4,907,162 | 3/1990 | Fougere | 364/464.02 |
| 5,077,792 | 12/1991 | Herring | 380/24 |
| 5,187,798 | 2/1993 | Nambudiri et al. | 395/800 |
| 5,200,903 | 4/1993 | Gllham | 364/464.02 |

FOREIGN PATENT DOCUMENTS 2127745 of 0000 United Kingdom .

*Primary Examiner*—James P. Trammell
*Assistant Examiner*—Chinor M. Lee
*Attorney, Agent, or Firm*—Shoemaker and Mattare, Ltd.

[57] ABSTRACT

A postage meter includes a memory including an ascending credit register to store an accumulated value of credit and an ascending tote register to store an accumulated tote value of postage charge dispensed by the postage meter in franking mail items. Accounting means of the postage meter determines whether the sum of a required postage value to be applied to a mail item and the accumulated tote value is equal to or less than the accumulated total value of credit stored in the ascending credit register and, if the sum of the required postage value and the accumulated tote value is equal to or less than the accumulated credit value, operates printing means to print a franking impression on the mail item and increments the accumulated tote value stored in the tote register by an amount equal to the required postage value.

7 Claims, 1 Drawing Sheet

POSTAGE METER USING TWO ASCENDING REGISTERS IN AN ACCOUNTING FUNCTION

BACKGROUND OF THE INVENTION

This invention relates to postage meters and in particular to accounting for postage charges applied to mail items.

Known postage meters operating in a so-called prepayment mode include a descending register to store a value of credit available for use in franking operations. As each mail item is franked with a printed postage impression, the value of credit registered in the descending register is decremented by an amount equal to the postage charge for the mail item. Periodically the credit can be replenished in a recrediting operation in which the postal authority carries out an exchange of data with registers of the postage meter and increments the descending register by an amount equal to the value of credit purchased by a user of the postage meter.

SUMMARY OF THE INVENTION

According to a first aspect of the invention a postage meter includes printing means for printing franking impressions on mail items; means to carry out accounting and control functions in respect of franking operations in which franking impressions are printed on the mail items; a first ascending register to store an accumulated value of credit; a second ascending register to store an accumulated value of postage charge dispensed by the postage meter in franking mail items; said accounting means being operative in a franking operation of the postage meter to determine if the sum of a required postage value to be applied to a mail item and the accumulated value stored in said second register is equal to or less than the accumulated total value of credit stored in said first register and in response to determination of the sum of the required postage value to be applied to a mail item and the accumulated value stored in said second register being equal to or less than the accumulated total value of credit stored in said first register operating the printing means to print a franking impression on the mail item and to increment the accumulated value stored in said second register by an amount equal to said required postage value.

According to a second aspect of the invention a method of operating a postage meter comprises the steps of storing an accumulated total value of credit entered into the postage meter; storing an accumulated total value of postage charges dispensed by the postage meter; determining if the sum of a required postage value to be applied to a mail item and the accumulated value of postage charge dispensed by the postage meter is equal to or less than the accumulated total value of credit and in response to determination that the sum of the required postage value to be applied to a mail item and the accumulated value of dispensed postage charges is equal to or less than the accumulated total value of credit the steps of operating printing means to print a franking impression on the mail item and incrementing the accumulated value of dispensed postage charges by an amount equal to said required postage value.

BRIEF DESCRIPTION OF THE DRAWING

An embodiment of the invention will be described hereinafter by way of example with reference to the drawings in which.

DESCRIPTION OF THE PREFERRED EMBODIMENT

Figure 1:
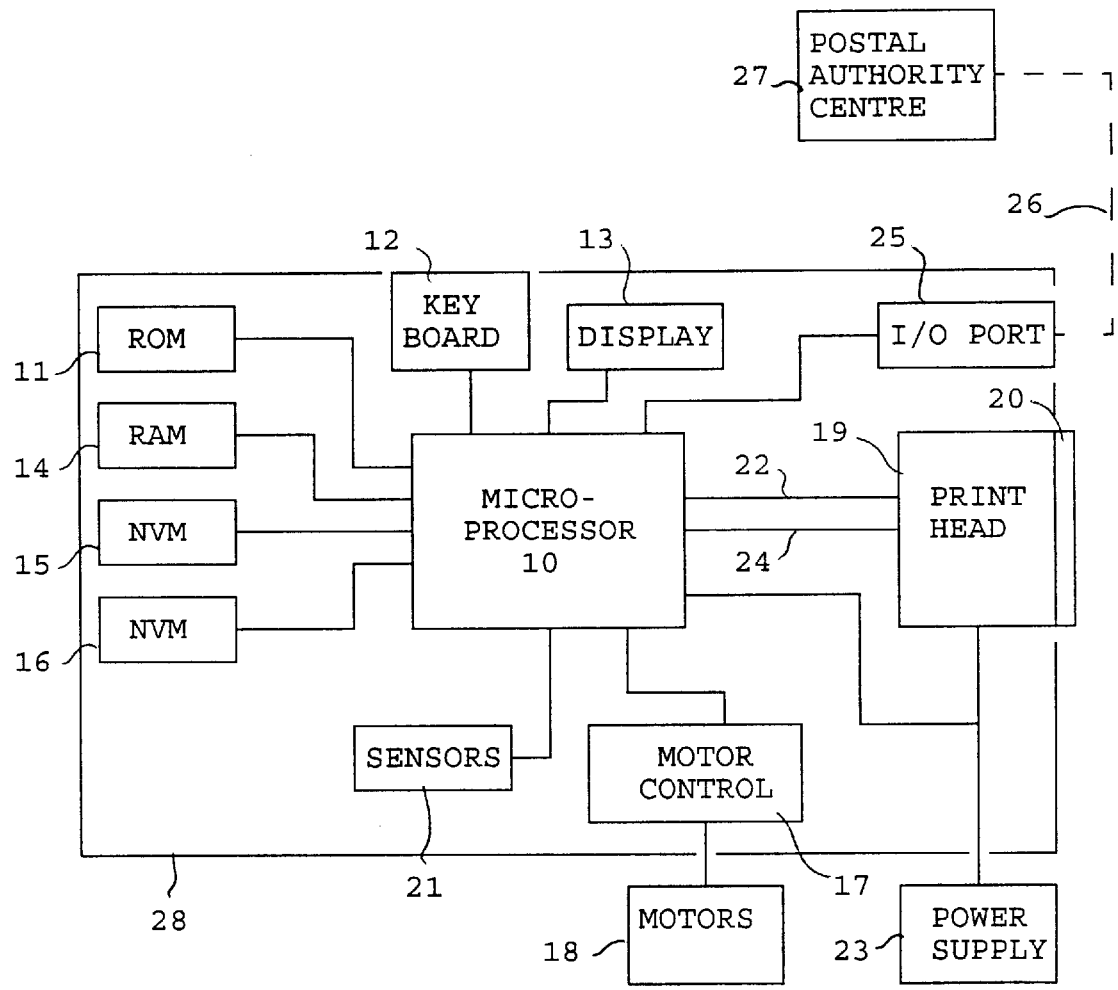
FIG. 1 is a block circuit diagram of a postage meter.

Referring to the drawing, the postage meter includes electronic accounting and control means comprising a micro-processor 10 operating under program routines stored in a read only memory (ROM) 11. A keyboard 12 is provided for input of commands and data by a user and a display 13 is provided to enable display of information to the user. A random access memory (RAM) 14 is provided for use as a working store for storage of temporary data during operation of the postage meter. Non-volatile duplicated memories 15, 16 are provided for the storage of critical data relating to use of the postage meter and which is required to be retained even when the postage meter is not powered. The microprocessor 10 carries out accounting functions in relation to use of the postage meter for franking mail items with postage charges applicable to handling of the mail items by the postal authority or other carriers. Accounting data relating to use of the postage meter for printing franking impressions representing postage charges for mail items and any other critical data to be retained is stored in the non-volatile memories 15, 16.

Figure 2:
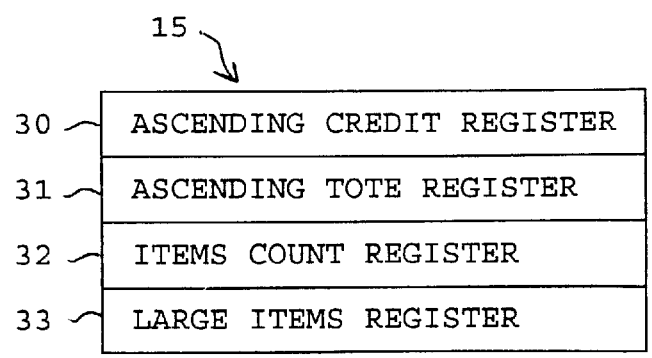
FIG. 2 illustrates registers provided in non-volatile memory of the postage meter.

The accounting data includes an accumulated total value of credit entered into the postage meter, an accumulated total value of postage charge dispensed by the meter in franking mail items, a count of the number of mail items franked by the meter and a count of the number of mail items franked with a postage charge in excess of a predetermined value. The accumulated total value of credit is stored in an ascending credit register 30 (FIG. 2), the accumulated total value of postage charges dispensed is stored in an ascending tote register 31, the count of items is stored in an items count register 32 and the count of items franked with a postage charge in excess of a predetermined value is stored in a large items register 33. As is well known in the postage meter art, each of the registers 30, 31, 32, 33 referred to hereinbefore for storing accounting data may be replicated in order to enable integrity of the accounting data to be maintained even in the event of a fault or termination of power to the meter during a franking operation. Two replications of each of the registers 30, 31, 32 and 33 are provided in each of the memory devices 15, 16.

A motor controller 17 is controlled by the microprocessor 10 to control operation of motors 18 driving feeding means (not shown) for feeding a mail item past a digital print head 19. The digital print head 19 is preferably a thermal print head including selectively energisable thermal printing elements 20. Sensors 21 are provided to sense and monitor feeding of the mail item. The sensors provide signals to the microprocessor to enable the microprocessor to control feeding of the mail item and to selectively energise the thermal print elements 20 of the print head at appropriate times as the mail item is fed past the print head. As the mail item is fed past the thermal printing elements 20 of the print head 19 during a printing operation, the microprocessor outputs on line 22, in each of a series of printing cycles, print data signals selecting those ones of the printing elements 20 which are to be energised in each respective printing cycle. A pulse of electrical power is supplied to the selected thermal printing elements from a power source 23 when a strobe signal is supplied by the microprocessor on a line 24 to the print head.

The thermal printing elements 20 are disposed in a line extending transversely to the direction in which the mail item is fed. Energisation of selected thermal printing elements of the print head in a printing cycle causes heating of areas of the ink layer of the thermal transfer ink ribbon adjacent the energised printing elements. Heating of areas of the ink layer causes those heated areas to adhere more strongly to the mail item than to a substrate backing layer of the ribbon so that when the ribbon is peeled from the mail item after passing the print head, the heated areas remain adhered to the mail item to form printed dots in required locations in a row and the unheated part of the ink layer remains adhered to the backing layer of the ribbon as it is peeled from the mail item. Since the mail item and thermal transfer ink ribbon are fed past the print head during the printing operation, repeated selection and energisation of selected printing elements in the series of printing cycles results in printing of dots in required positions of a corresponding series of columns spaced along the mail item in the direction of feeding of the item. Accordingly a complete printed impression is built up in a column by column manner in the series of printing cycles of a printing operation.

Additional credit may be entered into the postage meter by the postal authority or by an entity authorised by and acting on behalf of the postal authority. The postage meter may be taken to a credit resetting office where secure access is made to the registers of the postage meter to read the contents of the registers and then to enter additional credit by resetting the accumulated total value of credit in the ascending credit register so as to register an accumulated total value of credit incremented, over the previous accumulated total value of credit, by a desired amount of credit increment. It may be more convenient to reset the credit register remotely which remote resetting can be effected at the user's premises and does not entail taking the postage meter to a resetting office. Remote resetting of the credit register may be effected using an input/output port 25 to enable communication via a communication link such as a telephone network 26 with a remote postal authority centre 27. Procedures for resetting and remote resetting of postage meters are well known in the postage meter art.

It will be appreciated that, as is well known in the postage meter art, the postage meter must operate in a secure manner and be protected from attempts to use the meter fraudulently for example by utilising the postage meter to print franking impressions on mail items for which no corresponding postage charge has been accounted for by the accounting means. Accordingly those parts of the postage meter required to be secured against unauthorised tampering are housed in a secure housing 28.

In so-called prepayment operation of a postage meter, the ascending credit register of the meter is set with an accumulated total value of credit which has been entered into the postage meter. As mentioned hereinbefore, another ascending register, referred to as the tote register, stores an accumulated total value of postage used in franking mail items. Each time a franking operation is to be performed to frank a mail item with a required postage charge, the microprocessor 10 carries out a routine in which a determination is made as to whether the sum of the required postage charge and the accumulated total value of postage charges is equal to or less than the accumulated total value of credit in the ascending credit register. If the sum of the required postage charge and the accumulated total value of postage charges is determined to be equal to or less than the accumulated total value of credit in the ascending credit register, the amount of credit available is sufficient to cover the cost of the required postage charge intended to be applied in respect of the mail item and the franking operation is continued. The accumulated total value of postage charges currently stored in the tote register is incremented by the amount of the required postage charge and the incremented value of postage charges is written to the tote register.

The determination to whether the sum of the required postage charge and the accumulated total value of postage charges is equal to or less than the accumulated total value of credit in the ascending credit register may be effected by a comparison step or by a calculation step.

If the microprocessor determines that the sum of the required postage charge and the accumulated total value of postage charges is not equal to or less than the accumulated total value of credit in the ascending credit register, the microprocessor not only terminates the current franking operation and but may lock the postage meter from further use in franking mail items until such time as the accumulated total value of credit in the ascending credit register has been reset to a higher value.

However if the sum of the required postage charge and the accumulated total value of postage charges is not equal to or less than the accumulated total value of credit in the ascending credit register, there is insufficient credit available to meet the cost of the required postage charge and the routine is terminated and no franking impression is printed.

It will be understood that in the postage meter of the present invention, the credit register is an ascending register and this credit register is not decremented in respect of postage charges dispensed by the postage meter as is effected in known postage meters. Thus the value registered in the ascending register is an accumulated value of credit entered into the machine and, subsequent to the first franking operation performed by the postage meter, is not a value of credit available to be dispensed.

Hereinbefore reference has been made to communication being established with a postal authority centre and to resetting of the accumulated total credit in the postage meter by the postal authority. However it is to be understood that the term postal authority is intended to include other entities or personnel authorised by the postal authority and for example is to be understood as including a postage meter supplying company authorised to operate a postage meter resetting facility.

I claim:

1. A postage meter including printing means for printing franking impressions on mail items; accounting means to carry out accounting and control functions in respect of franking operations in which franking impressions are printed on the mail items; a first ascending register to store an accumulated value of credit; a second ascending register to store an accumulated value of postage charges dispensed by the postage meter in franking mail items; said accounting means being responsive to an input of a required postage value to be applied to a mail item, to the accumulated value of credit stored in said first ascending register and to the accumulated value of dispensed postage charges stored in said second ascending register to determine it the accumulated value of credit stored in said first register is at least equal to a sum of the required postage value and the accumulated value stored in said second register and in response to determination of the accumulated value of credit stored in said first register being at least equal to said sum of the required postage value and the accumulated value stored in said second register said accounting means being operative to operate the printing means to print a franking impression corresponding to the required postage value on the mail item and to increment the accumulated value stored in said second register by an amount equal to said required postage value.

2. A postage meter as claimed in claim 1 wherein the accounting means is operative to compare the sum of the required postage value to be applied to the mail item and the accumulated value stored in said second register with an amount equal to the accumulated total value of credit stored in said first register to determine if the accumulated total value of credit stored in said first register is at least equal to the sum of the required postage value to be applied to a mail item and the accumulated value stored in said second register.

3. A postage meter as claimed in claim 1 wherein the accounting means is operative to perform a calculation in respect of the sum of the required postage value to be applied to the mail item and the accumulated value stored in said second register and an amount equal to the accumulated total value of credit stored in said first register to determine if the accumulated total value of credit stored in said first register is at least equal to the sum of the required postage value to be applied to a mail item and the accumulated value stored in said second register.

4. A method of operating a postage meter comprising the steps of storing an accumulated total value of credit entered into the postage meter; storing an accumulated total value of postage charges dispensed by the postage meter; utilizing the accumulated total value of credit to determine if the stored accumulated total value of credit is at least equal to the sum of a required postage value to be applied to a mail item and the accumulated total value of postage charge dispensed by the postage meter and in response to determination that the accumulated total value of credit is at least equal to the sum of the required postage value to be applied to a mail item and the accumulated total value of dispensed postage charges the steps of operating printing means to print a franking impression corresponding to the required postage value on the mail item and incrementing the accumulated value of dispensed postage charges by an amount equal to said required postage value.

5. Postage meter apparatus operable to dispense postage charges in respect of mail items including accounting means operable to carry out accounting functions in respect of dispensing postage charges for the mail items; a first ascending register to store an accumulated value of credit inputs to the postage meter apparatus; a second ascending register to store an accumulated value of postage charges dispensed by the postage meter apparatus; said accounting means being responsive to an input of a required postage charge in respect of a mail item, to the accumulated value of credit stored in said first ascending register and to the accumulated value of dispensed postage charges stored in said second ascending register to determine if the accumulated value of credit stored in said first register is at least equal to a sum of the required postage charge and the accumulated value stored in said second register and in response to a determination that the accumulated total value of credit stored in said first register is at least equal to said sum said accounting means being operative to dispense said required postage charge and to increment the accumulated value stored in said second register by an amount equal to said required postage charge.

6. Postage meter apparatus as claimed in claim 5 wherein the accounting means is operative to determine if the accumulated total value of credit stored in said first register is at least equal to the sum of the required postage charge and the accumulated value stored in the second register by comparing said sum with the accumulated value of credit stored in said first register.

7. Postage meter apparatus as claimed in claim 5 wherein the accounting means is operative to determine if the accumulated total value of credit stored in said first register is at least equal to the sum of the required postage charge and the accumulated value stored in the second register by performing a calculation in respect of the required postage charge, the accumulated value stored in the first ascending register and the accumulated value of credit stored in said first register.

\* \* \* \* \*